United States Patent
Sun et al.

(10) Patent No.: US 6,295,194 B1
(45) Date of Patent: Sep. 25, 2001

(54) BEAD OR PARTICLE MANIPULATING CHUCKS

(75) Inventors: Hoi Cheong Sun, Monmouth Junction; Bawa Singh, Voorhees; Howard Christopher Rivenburg, Princeton, all of NJ (US)

(73) Assignee: Delsys Pharmaceutical Corporation

( * ) Notice: Subject to any disclaimer, the term of this patent is extended or adjusted under 35 U.S.C. 154(b) by 0 days.

(21) Appl. No.: 09/393,871

(22) Filed: Sep. 10, 1999

(51) Int. Cl.[7] .................................................. H02N 13/00
(52) U.S. Cl. ........................................ 361/234; 361/233
(58) Field of Search .................................. 361/233, 234, 361/226; 279/128

(56) References Cited

U.S. PATENT DOCUMENTS

| | | | |
|---|---|---|---|
| 3,872,361 | * 3/1975 | Masuda ................................. | 361/233 |
| 4,257,083 | * 3/1981 | Blyth .................................... | 361/234 |
| 4,316,233 | * 2/1982 | Chato et al. ........................... | 361/233 |
| 4,700,262 | 10/1987 | Inculet . | |
| 5,090,643 | * 2/1992 | Spears .................................. | 361/234 |
| 5,303,117 | * 4/1994 | Ogihara et al. ....................... | 361/233 |
| 5,714,007 | 2/1998 | Sun et al. . | |
| 5,753,302 | 5/1998 | Sun et al. . | |
| 5,788,814 | * 8/1998 | Sun et al. ........................ | 204/297 R |
| 5,846,595 | 12/1998 | Sun et al. . | |
| 5,858,099 | 1/1999 | Pletcher et al. . | |
| 5,988,432 | * 11/1999 | Sun ..................................... | 221/212 |
| 6,007,630 | 12/1999 | Pletcher et al. . | |
| 6,063,194 | 5/2000 | Poliniak et al. . | |
| 6,096,368 | * 8/2000 | Sun .................................... | 427/2.14 |
| 6,149,774 | * 11/2000 | Sun et al. ............................ | 204/164 |
| 6,168,666 | 1/2001 | Sun . | |

OTHER PUBLICATIONS

International Search Report from Corresponding International Patent Application No. PCT/US00/40868. Jan. 4, 2001.
Sun, et al., U.S. application Ser. No. 09/095,321, filed Jun. 10, 1998.
Poliniak, et al., U.S. application Ser. No. 09/095,616, filed Jun. 10, 1998.

* cited by examiner

*Primary Examiner*—Fritz Fleming
(74) *Attorney, Agent, or Firm*—Dechert (57) ABSTRACT

Provided is a method of moving a charged particle from a first position at which it is retained by a first electrode to a second position at which it is retained by a second electrode, the method comprising: applying a potential to the second electrode to attract the particle; and applying a potential to a guide electrode offset from the particle at the first position, wherein the applied potential is effective to reduce the attraction of the particle to the first position sufficiently to allow the potential applied at the second electrode to be effective to move the particle from the first position to the second position.

19 Claims, 5 Drawing Sheets

BEAD OR PARTICLE MANIPULATING CHUCKS

The present invention is directed to devices for electrically picking up and dispensing electrically charged beads or particles in a spatially resolved manner. Specifically, this disclosure describes novel electrode configurations and operation techniques for electrostatic transporter chucks that pick up, manipulate, transport, and then discharge or place beads, particles or objects for use in creating pharmaceutical or chemical compositions, or in performing assays or chemical analysis. The invention provides for use of guide electrodes and guide fields to aid in moving, switching, shifting or manipulating beads or particles from an originating electrode to a target electrode, with lateral motions and other bead manipulation possible in up to three dimensions, as described below.

Electrostatic transporter chucks can be used to pick up, manipulate, transport, and then discharge or place beads, particles or objects for use in creating pharmaceutical or chemical compositions, or in performing assays or chemical analysis.

Transporter chucks act as clamps to hold or retain an object or objects. Transporter chucks provide superior performance for manipulating synthetic beads or particles having typical diameters of 100–300 microns in chemical synthesis, such as combinatorial chemistry for solid phase synthesis, or in an assay using PCR (polymerase chain reaction) or other processes. In combinatorial chemistry, a multi-well array such as a microtiter plate allows screening or synthesis of many compounds simultaneously.

For example, transporter chucks allow deposition of beads or particles on an array in a manner that is fast and reliable. Another application for transporter chucks is synthesis of pharmaceutical compositions, especially when used to combine compounds to form compositions to be packaged into administration forms for humans or animals.

Beads or particles containing one or more active ingredients can be deposited onto well known carriers or substrates to make pharmaceutical dosage forms. Such beads or particles can take the form, for example, of [1] a powder, such as dry micronized forms made by air jet milling processes, where overall particle dimensions can be, for example, in the 1 to 10 micron range useful for dry powder respiratory administration of medicaments, such as 4–8 microns; [2] microspheres; [3] extremely small structures, including fullerenes, chelates, or nanotubes; or [4] liposomes and fatty droplets formed from lipids or cell membranes.

The use of transporter chucks provides a customized and precise method for formulating drug compositions. The transporter chucks can be used when merging adjacent substrates carrying active ingredient to form multidosage packs, in which dosage can decrease or increase from one individual unit to the next, as in hormone-based (e.g., birth control) drugs or antibiotic remedies. Using an electrostatic transporter chuck, dosages can be established or determined by the number or type of beads or particles dispensed onto each pharmaceutical carrier, or by using electrical, optical, or mechanical dosage sensing. Using transporter chucks to place active ingredients into pharmaceutical compositions can yield high repeatability and is also advantageous when ingredients are not compatible, such as when the active ingredient is poorly soluble with the carrier, or where a formulation or carrier negatively affects the bioavailability of the active ingredient.

Although emphasis is placed in this disclosure on use of electrostatic transporter chucks that apply electric fields for bead retention or release, the teachings given here can be applied to chucks that also use other phenomena, such as the use of compressed gas or vacuum, or electrically/chemically switchable adhesives, in controlling beads or particles or substrates. Electrostatic or quasi-electrostatic holding mechanisms, however, are often more benign to delicate bead structures than traditional mechanical techniques, particularly when manipulating biologically active compounds where crushing, contamination, or oxidative damage should be minimized or eliminated.

Typically, beads or particles to be transported or manipulated are tribo-charged (through frictional encounters and collisions, such as rubbing or bumping) into or through charge induction. Other forms of charging, such as corona or plasma charging, can be used.

The present invention can involve use of acoustic stimulation or acoustic dispensers, where acoustic energy, provided by a speaker or piezoelectric device, is used to great advantage in bead control. Such energy can help propel or tribocharge beads or particles prior to or during electrostatic manipulation. Tribocharging beads or particles, as known in the art, and described below, can be more efficient and less damaging to the beads or particles than corona or plasma charging, which typically requires high applied voltages of around 5 kV. Often, the sonically vibrating membrane or mesh used in such an acoustic bead dispenser can itself be used to tribocharge the particles, eliminating the need to charge the beads or particles prior to their entry into the acoustic dispenser. The use of acoustic dispensers allows polarity discrimination of beads or particles, where wrongly charged beads or particles are discouraged from being retained by the transporter chuck.

Some transporter chucks offer precision in being able to have one, and only one bead attracted, transported, and discharged for each transporter chuck, or for each well, pixel, or individual spatial element of the transporter chuck. In many cases, each pixel can be considered a tiny transporter chuck that is selectively and independently controlled, such as planar chucks having individually addressable x and y coordinates. Such transporter chucks can include individually addressable pixels for different (multiple) bead types.

Beads or particles manipulated by these transporter chucks (or manipulating chucks) are easily and controllably releasable, with wrongly charged beads or particles (objects or beads having a charge of the opposite polarity desired) not occupying bead retaining or collection zones on the transporter chuck. Such transporter chucks function well for a wide range of bead diameters, including beads or particles with general dimensions of 100 microns up to a few millimeters or more, and also including porous or hollow beads or particles that have high charge/mass ratios. Such transporter chucks also offer durability and re-usability, and ease-of-use, including having selectively or wholly transparent elements for movement and alignment of the chuck with intended targets or carriers.

Often, instead of depositing beads or particles singly, transporter chucks are used to attract and place powder, such as powder containing active ingredient, on a substrate, such an edible substrate for use in pharmaceutical dosage forms.

Electrodes used for attracting beads or particles can vary widely in construction and structure. Bead attracting electrodes, can, for example, be directly exposed, or covered by a dielectric (for example, to prevent ionic breakdown (sparking) in air and to make use of the properties of dielectrics to enhance bead charge holding capacity). To control the amount of charged beads or particles that can be attracted, an indirect method can also be used where a bead attraction electrode attracts beads or particles indirectly, using capacitive coupling to a pad or floating electrode. The instant invention can be applied to any number of transporter chuck designs, but for illustration purposes, a simple chuck is shown here to attract beads or particles directly by way of one or more directly biased (non-floating) electrodes.

Methods for use of transporter chucks and acoustic bead dispensers are set forth, for example, in Sun, "Chucks and Methods for Positioning Multiple Objects on a Substrate," U.S. Pat. No. 5,788,814, issued Aug. 4, 1998; Sun et al., "Method of Making Pharmaceutical Using Electrostatic Chuck," U.S. Pat. No. 5,858,099, issued Jan. 12, 1999; Patcher et al., "Apparatus for Electrostatically Depositing a Medicament Powder Upon Predefined Regions of a Substrate," U.S. Pat. No. 5,714,007, issued Feb. 3, 1998; Sun et al., "Method of making pharmaceutical using electrostatic chuck," U.S. Pat. No. 5,846,595, issued Dec. 8, 1998; Sun et al., "Acoustic Dispenser," U.S. Pat. No. 5,753,302, filed May 19, 1998; Sun, "Bead Transporter Chucks Using Repulsive Field Guidance," U.S. Pat. No. 6,096,368, issued Aug. 1, 2000; Sun, "Bead manipulating Chucks with Bead Size Selector,", U.S. Pat. No. 5,988,432, issued Nov. 23, 1999; Sun, "Focused Acoustic Bead Charger/Dispenser for Bead Manipulating Chucks," U.S. Pat. No. 6,168,666, issued Jan. 2, 2001; Sun et al., "AC Waveforms Biasing For Bead Manipulating Chucks," U.S. Pat. No. 6,149,744, issued Nov. 21, 2000; Sun et al, "Apparatus for Clamping a Planar Substrate," Ser. No. 09/095,321, filed Jun. 10, 1998.; Poling et al., "Dry Powder Deposition Apparatus," U.S. Pat. No. 6,063,194, issued May 16, 2000; and "Pharmaceutical Product and Method of Making," Ser. No. 09/095,616, filed Jun. 10, 1998.

However, these conventional transporter chuck designs and operation techniques using attraction electrodes to pick up and discharge beads or particles can, under certain conditions, encounter problems when attempting to move or shift beads or particles, individually or together, from one electrode to another, such as during assays or chemical synthesis. Specific or special manipulations, such as counting operations or matrix manipulations, such as where an entire ordered column of beads or particles is moved in an ordered manner to a specific location, or through a specific angle, can be especially difficult to reproducible achieve without causing additional complications such as arcing and misquoting of beads or particles.

One problem encountered arises because charged beads or particles in the vicinity of any conductive surface are subject to powerful electrostatic image forces. As a charged bead approaches any metal or conductive surface, such as a bead attraction electrode inside a bead dispenser or container, an image charge of opposite polarity will accumulate on that conductive surface. This charge accumulation happens when mobile charge carriers in the conductive surface are attracted by, or repelled by, the bead or particle charge. This movement of charge in the conductive surface in response to a charged bead in the vicinity creates a potent image charge-induced holding force, or electrostatic image force. The electrostatic image force tends to make a bead or particle highly attracted to the conductive surface, which can lead to a tight association with the surface. It should be noted that dielectric beads or particles in stationary tight contact with a conductive surface have a tendency to keep their charge for long periods, often several days. With a bead very close (e.g., contacting) to a conductor, the electrostatic image force can be greater than that due to the applied field originally used to accelerate the beads or particles toward the transporter chuck, and can be on the order of hundreds of times the force due to gravity. This image force makes it harder to provoke motion of a bead toward another electrode, site, or conductive surface, especially a chosen destination that can be a substantial distance away.

Generally, to attract and retain beads or particles, the total electrical force $F_{elec}$ generated by the total electric field vector $E_{total}$ inside a bead or particle dispenser or container on a bead or particle with mass m and charge q subject to gravitational acceleration g must be equal to or greater, overall, than the force of gravity, $F_{grav}$, for the bead or particle, so that beads or particles can be accelerated toward one or more attraction electrodes:

$$F_{elec} = E_{total} \, q \geq F_{grav} = m \, g \qquad (1)$$

Upon applying a voltage to a bead attraction electrode (9), a bead attraction field $E_a$ can be established. This attraction field $E_a$ can cause beads or particles to be accelerated in the direction of, and subsequently retained by the electrode or bead retention zone.

The total electric field vector, $E_{total}$, results from a number of electric field components, by the principle of superposition. Typically, in the bead dispenser or bead manipulation theater, the total electric field at any point, $E_{total}$, is the vector sum of any discrimination field $E_{discrim}$ applied between the transporter chuck and a distant mesh or other electrode or surface; any polarization field $E_p$ resulting from internal charge polarization inside beads, particles or other bodies present in the bead manipulation theater; any rejection or repulsion fields $E_r$ set up to discourage bead attraction in selected areas, or to repel beads or particles, such as by applying a repulsive bias to one or more electrodes or conductive surfaces; any bead attraction fields $E_a$ set up via an attractive bias applied to one or more bead attraction electrodes; and all electrostatic image fields $E_{image}$ set up by conductive surfaces on the transporter chuck or in the bead manipulation theater:

$$E_{total} = E_{discrim} + E_p + E_r + E_a + E_{image} \qquad (2)$$

Bead motions and interactions, or collisions with obstacles—and each other—inside a dispenser or container tend to randomize their motion, and this randomization influences bead transport properties, as beads or particles are accelerated toward intended electrodes or bead retention zones. However, in spite of this, the pull of a locally generated electrostatic image force, such as that generated by a bead in the vicinity of an attraction electrode, remains in force and is hard to overcome.

In the vicinity of the transporter chuck, with a charged bead or particle at a distance d from any conductive surface in the chuck, the electrostatic image force, $F_{image}$, due to the image charge can become, as the bead nears the chuck, far more significant than the force $F_a = E_a \, q$ generated by the bead attraction field $E_a$:

$$F_{image} \gg F_a \qquad (3)$$

Roughly, the dependence of the electrostatic image force on the distance d for a given charge q on a bead, is as follows, using Coulomb's Law for stationary point charges:

$$F_{image} = \frac{q^2}{4\pi\varepsilon_0 d^2 (\pi d_{bead}^3 / 6)\rho g} \qquad (4)$$

In the denominator, $\varepsilon_0$ is the vacuum permittivity; $(\pi d_{bead}^3/6)$ is the bead volume; $\rho$ is the bead mass density in kg/m$^3$; and g is the acceleration due to gravity. This form gives the electrostatic image force in units of g. This electrostatic image force can become a potent force at short distances, but in practice the bead attraction field $E_a$ is still needed to bring charged beads or particles within its influence.

In order for a single bead to move laterally from one conducting electrode to another, it usually must overcome a frictional force. Since the electrostatic image force usually dominates in the vicinity of a conductive surface, the frictional force $F_\eta$ for a bead with mass m and charge q can be approximated by $$F_\eta = (m\ g\ D + F_{image})\eta_{static} \qquad (5)$$

where g is the acceleration due to gravity; D is a directional constant between 0 and 1, such as D=sin θ, where θ is an inclination angle for the chuck surface; $F_{image}$ is the electrostatic image force between the charge on the bead and the image charge induced on the originating electrode, which is a force normal or perpendicular to the origination electrode 9; and $\eta_{static}$ is the static coefficient of friction. For non-sliding processes, such as where a bead is free to roll toward a destination, an equivalent dynamic or rolling coefficient of friction (e.g, $\eta_{dynamic}$ or $\eta_{rolling}$) can be substituted instead. For a better value of $F_\eta$, a total bead retaining force $F_{retain}$ as given below can be substituted for $F_{image}$.

A variety of techniques can be used simultaneously to enhance transporter chuck effectiveness, and in particular, to enhance the accuracy and reproducibility of bead or particle manipulations from origination to target electrodes or bead retention zones. These include use of periodic air or fluid flow provided acoustically by a conventional speaker. Such a speaker (not shown) can be in fluid communication with some part of the bead dispenser or bead manipulation theater, so that it can direct acoustic energy to unseat beads or particles that are held by electrostatic image forces to dispenser surfaces, or during bead or particle discharge at a desired target, to unseat beads or particles held by electrostatic image forces to the chuck itself. However, such energy can impart random motion to the beads or particles, making accurate transfer of beads or particles to intended locations more difficult.

In trying to overcome the strength of the electrostatic image force $F_{image}$, one can increase substantially the attractive field $F_a$ to force the bead or particle toward the chosen or destination electrode. As an example, a bead or particle size of about 100 μm having a typical charge/mass ratio of 0.25 μC/g can give a total bead charge of 0.25 pC (pico-Coulombs). As a worst case, this bead or particle charge is concentrated at a point near the bead or particle surface, and the resultant electrostatic image force resulting from contact of the bead or particle with any conductive surface would be as high as 22 μN (micro-Newtons); this force is much greater than the bead or particle's gravitational weight of 9.8 nN (nano-Newtons). To move such a bead or particle away from that conductive surface toward another desired conductive surface would require an electric field E of 90 MV/m (Mega-volts per meter), which is about 32 times the typical ionic breakdown voltage for dry air at room temperature.

In practice, however, bead or particle charges are never concentrated at one point, and the equivalent air gap between the conductive surface and the center of the bead charge distribution after polarization will be perhaps ⅓ the bead or particle diameter. This charge separation and charge dispersion lowers the resultant electrostatic image force for this example by a factor of 40, but it is still 50 times the force of gravity. Upon application of a high enough $F_a$ as described above, the bead will move in most cases. However, high electric fields $E_a$ introduce the possibility of arcing, particularly if ambient conditions change (such as due to changes in gas composition, humidity, or airborne particulate density) and the high electric fields can disturb intended bead motions, causing unwanted changes of the positioning of other beads or particles.

It is therefore desirable not only to obtain high resolution, directed manipulations that overcome the tendency of electrostatic image forces to prevent inter-electrode motions, but also to provide a method that allows automated matrix motion operations that permit accurate, repeatable directed particle transfers, particle counting, and particle sorting operations, without adversely affecting positioning of adjacent beads or particles or causing arcing inside the bead manipulation theater.

Other objects sought and achieved by the invention will become apparent upon reading of the specification. For example, it is a further object of the invention to exploit additional electrostatic image forces to cancel, in whole or in part, those due to origination electrodes from which beads or particles are to be transferred, thus allowing directed inter-electrode motions that would otherwise be prevented.

In attracting and manipulating beads or particles, electrostatic image charges, electric polarization, and bead mass and transport, play a role.

SUMMARY OF THE INVENTION

These problems are addressed by this invention using methods that reduce the effect of electrostatic image forces generated at an origination electrode, so as to allow easier, more accurate and reproducible transfers to a target electrode.

In one embodiment, method of moving a charged particle from a first position at which it is retained by a first electrode to a second position at which it is retained by a second electrode, the method comprising: applying a potential to the second electrode to attract the particle; and applying a potential to a guide electrode offset from the particle at the first position, wherein the applied potential is effective to reduce the attraction of the particle to the first position sufficiently to allow the potential applied at the second electrode to be effective to move the particle from the first position to the second position. Preferably, the first electrode is separated from the first position be a dielectric selected to reduce an image force induced between the first electrode and the particle sufficiently to allow said applying steps to be effective to move the particle without voltage arcing between electrodes, while maintaining a sufficient image force to retain the particle at the first position prior to application of the two applying steps.

In another embodiment, a transporter chuck is disclosed for attracting beads or particles to first and second bead retaining zones on a bead contact surface, and for retaining and discharging beads or particles from the first and second bead retaining zones. The transporter chuck comprises an origination electrode for selectively establishing an attraction field at the first bead retaining zone; a target electrode for selectively establishing an attraction field at the second bead retaining zone; and a guide electrode positioned, sized and oriented adjacent at least one of the origination electrode, the target electrode, the first and the second bead retaining zones, so as to establish a guide field; wherein the guide field urges any of the beads or particles retained at the first bead retention zone to move away from the first bead retention zone.

Optionally, the guide electrode can be biased attractively with respect to at least one bead. Also, a dielectric can be positioned between at least one of the first and second bead retention zones and at least one of the origination electrode and the target electrode. To enhance performance using the invention, the dielectric thickness can be chosen to keep the electrostatic image force generated at the origination electrode within maximum and minimum limits.

The guide electrode can be movable with respect to the first and second bead retention zones of the transporter chuck, wherein the first and second bead retention zones, and the guide electrode, can be selectively brought near one another.

In other embodiments, an array of bead retention zones can be established wherein the first and second bead retention zones are not immediately adjacent one another. This array can be two-dimensional, or three dimensional, with the guide electrode placed accordingly.

Also disclosed is a method whereby the transporter chuck using a guide electrode according to the invention is used to transfer a bead from an origination electrode to a target electrode 10. The method comprises: [a] applying a first potential to the origination electrode of the transporter chuck to establish an attraction field and [b] attracting and retaining a bead to the first bead retention zone. Additionally, one can [c] reduce the first potential applied to the origination electrode; and [d] apply a second potential to the target electrode to establish a second attraction field, thereby urging the bead to the target electrode.

One can then also [e] align the transporter chuck with a desired location prior to possible bead discharge.

Additionally, one can also [f] ground the origination electrode or [g] apply to it a repulsive bias to establish a repulsion field. The effectiveness of the guide electrode can be increased by [h] applying a third potential to it, to establish a guide attraction field to further reduce the electrostatic image force generated at the origination electrode.

Upon successful transfer of a bead from the origination electrode to the target electrode, one [i] can reduce the third potential applied to the guide electrode, including possibly [j] grounding the guide electrode or [k] applying a guide repulsive bias to it, to establish a repulsive guide field.

DEFINITIONS

The following definitions shall be employed throughout:

"AC" (alternating current) shall denote any electric current that reverses direction, perhaps periodically; or any applied potential of changing polarity. AC waveforms shall refer to any part or component of such alternating currents, such as a rectified square waveform comprising repeated single polarity pulses (see pulses below), with or without additional DC components.

"Acoustic" can refer to sound waves in air, but more generally can include any alteration of properties of whatever elastic medium is used inside the bead dispenser or bead manipulation theater. Possible elastic media include dry nitrogen or other gases; water; oil; propylene glycol; refrigerants, such any of the compounds bearing the trademark, Freon® (aliphatic organic compounds containing the elements carbon and fluorene, and others halogens such as chlorine and hydrogen); sand; and the like. Properties that can be altered include pressure, particle or molecule displacement, or density. Most commonly, acoustic effects are achieved using longitudinal compressive waves in the elastic medium, provided by a speaker (see definition below), but it can also occur by using jets or flow of the elastic medium.

"Attraction electrode" shall connote any electrode available to attract, retain, or electrically influence materials things such as beads, objects, or particles.

"Bead" or "beads" shall refer to any material thing such as a particle, object, tablet or receptacle, capable of being manipulated. Beads shall include any and all powders, spheres or beads made from polymer and reactive polymer masses, such as styrene-based polymers used in the Merrifield type of solid-phase synthesis.

"Bead contact surface" shall include all surfaces of the bead manipulating chuck that are accessible to bombardment, contact or exposure to beads, regardless of whether such access is physically encouraged or discouraged. However, when discussing specifically the bead retention zone (see definition below), the bead retention zone can then be considered separately from the remainder of the bead contact surface, to facilitate description of its placement in the bead manipulating chuck. The bead contact surface can be used to retain or accommodate a substrate as discussed herein.

"Bead retention zones" shall include surfaces of the bead contact surface at which bead attracting fields generated by bead attraction electrodes attract and favor retention of a bead. The bead retention zones can be found at holes, apertures, or recessed areas of the bead contact surface, or elsewhere.

"Bias" shall refer to any average direct current voltage applied to a conductor. "Bias" shall include alternating current (AC), AC waveforms, or pulses that when averaged over time reveal a non-zero DC applied overall voltage.

"Conductor" and "electrode" shall include surfaces or sets of surfaces, continuous or non-continuous, that are capable of carrying electric current.

"DC" (direct current) shall denote any quasi-static electric current that flows in one direction only, or any applied potential of single unchanging polarity.

"Dielectric" shall refer to any dielectric material, such as electric insulators in which an electric field can be sustained with a minimum power input; the term is applied generally such that solid metals, if manipulated to meet this definition, for example with a radio frequency applied voltage, can be considered dielectrics. This dielectric material need not be solid (e.g., it can be hollow) and it can be made up of substructures or different constituent dielectric subparts or material types.

"Floating electrode" shall refer to any electrode electrically isolated from ground or other electrodes and capacitively coupled to one or more bead electrodes for the purpose of attracting beads to one or more bead retention zones.

"Pulse" shall refer to quick variation of applied potentials which are otherwise constant, or nearly constant. This variation shall be of finite duration in relation to the charge decay or charge leakage on a substrate. In shape, a pulse or series of pulses can resemble spikes or parts or components of AC waveforms.

"Reducing," such as in the context of reducing applied potentials to bead electrodes to allow bead discharge, or the reduction of a retaining force, shall include reduction and reversal of polarity or sign of the applied potential or force, such as going from +500 V to −500 V, or vice versa.

"Shield electrode" refers to electrodes that are used at or near the bead contact surface to shield (at least partially) a charged bead from being influenced by attraction fields emanating from a bead retention zone, or to define and shape (narrow) the local electric attraction field to encourage bead retention only in intended bead retention zones.

"Speaker" can refer to any loudspeaker, transducer, machine, or device, such as a piezoelectric device, that is capable of providing acoustic energy, such as through pressure modulation; more generally, it is any device capable of altering the properties of the elastic medium used inside the bead dispenser or bead manipulation theater.

"Substrate" shall refer to any material body that receives or accommodates beads in the course of using a transporter chuck. It can comprise, for example, a pharmaceutical dosage form into which active ingredients, in the form of beads, can be attracted and retained. Substrates can be, for example, clamped or placed onto the bead contact surface of a transporter chuck, to receive beads in the form of powder, adjacent or over each bead retention zone.

Regarding electrode orientations, the invention is sometimes defined using the term "adjacent" such as where a guide electrode is positioned, sized and oriented adjacent at least one electrode, such as an origination electrode. In this context, the word adjacent shall mean close to, next to, or merely proximate, in terms of intended effect. The term immediately adjacent, such as where first and second bead retention zones are immediately adjacent one another, shall indicate that there are other bead retention zones located between them.

It is also important to note that although the terms electrostatic and quasi-electrostatic are used throughout this disclosure, no limitation is meant or intended in terms of time variations of charge on electrodes and conductors used in the present invention. Electrical currents can and will flow in the course of using the bead manipulating chucks as described, in order to apply and remove electric charge as required. Although the term, electrical, can also be used in lieu of the term, "electrostatic," a distinction of convenience is made, so as to make clear that while electrical or electrostatic forces are used to attract beads, the frequency of the applied potentials used is relatively low, that is, not meant to be on the order of radio or microwave frequencies. Potentials refer to electric potentials or applied voltages.

DETAILED DESCRIPTION OF THE INVENTION

Figure 1:
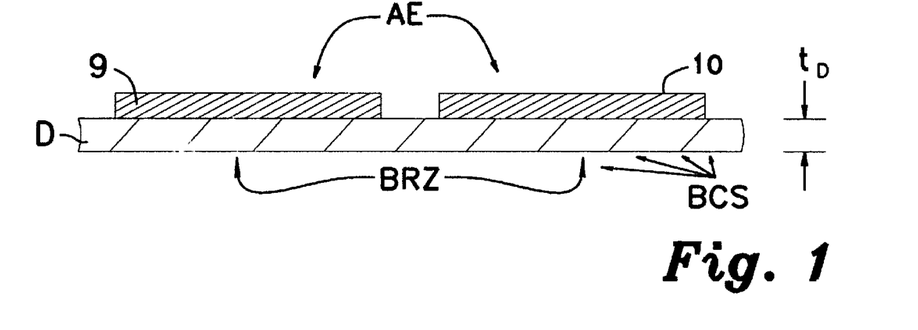
FIG. 1 shows a partial cross-sectional view of an example of a transporter chuck showing origination and target electrodes that correspond to two different respective bead retention zones.
Figure 2:
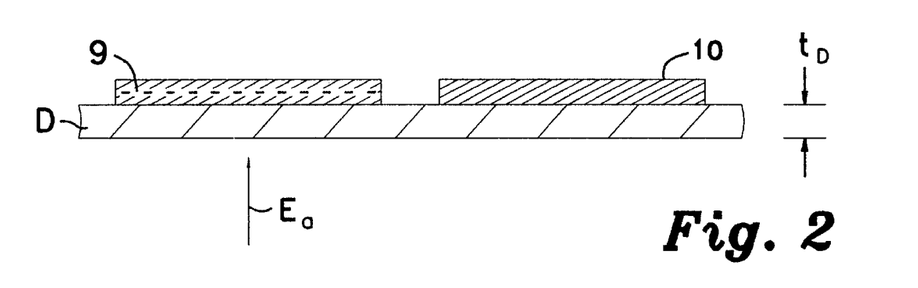
FIG. 2 shows the partial cross-sectional view of the transporter chuck of FIG. 1, using an attraction bias applied to the origination electrode.
Figure 3:
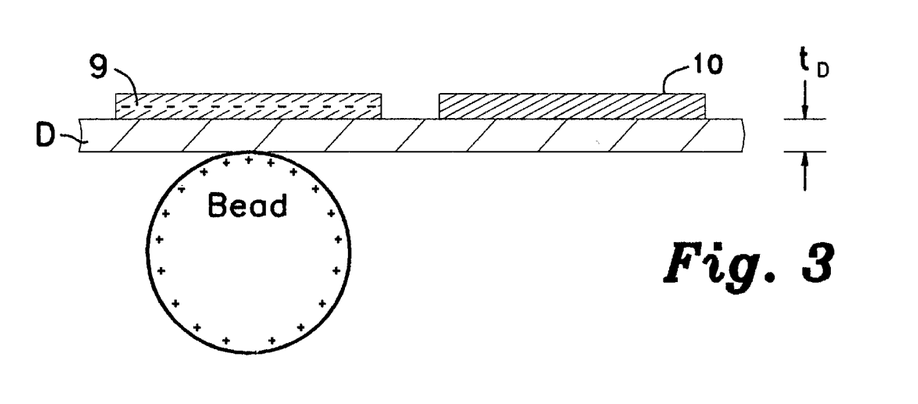
FIG. 3 shows the partial cross-sectional view of the transporter chuck of FIG. 2, with a bead attracted to and retained by the origination electrode, aided by the attraction bias applied to the origination electrode.

Referring to FIGS. 1, 2, and 3, partial cross-sectional views of a transporter chuck that can be used according to the present invention are shown, with structures given for two pixels or bead retention zones. The transporter chuck shown is merely illustrative, being given by example only to facilitate description. It is one of many typical transporter chucks and alternate chuck configurations that can be used to implement this invention.

The transporter chuck shown comprises two planar bead attraction electrodes that can be used to provide selectively-applied bead attracting fields. Specifically shown are origination electrode 9 and target electrode 10, which are mutually separated by an air gap (or insulator, if desired) and are affixed or contacting a top face of a planar dielectric layer D. Dielectric layer D can be applied to either or both origination electrode 9 and target electrode 10 using any number of techniques known in the art, such as laminating; powder deposition; or thin film deposition, such as magnetron sputtering, or electron beam evaporation. Dielectrics that can be used include commonly available materials such as Corning Pyrex 7740 glass (Corning Inc, Corning, N.Y.); or polyimide resin; a typical thickness is 10–20 mils. Dielectric layer D can allow for user safety, isolating the operator from high voltages.

Generally the outer, exposed face of dielectric layer D as shown forms a bead contact surface BCS that is accessible to bombardment, contact or exposure to beads or particles inside a bead dispenser or container, not shown. To attract and retain beads or particles at any bead retention zones BRZ, one or more attraction electrodes AE can be biased attractively for the beads or particles to be manipulated. For example, using a wire, conductor, cable, via, or bus (not shown), a negative potential or bias can be applied to origination electrode 9, indicated using negative symbolic charges as shown in FIG. 2. This attraction bias provides an attraction field $E_a$ as roughly shown and allows for acceleration of net positively charged beads or particles toward origination electrode 9, for retention at a first bead retention zone BRZ.

As shown, origination electrode 9 is not exposed to the bead contact surface BCS or the bead retention zone BRZ. The electric field, however, generated by a potential applied to origination electrode 9 or by image charge formation can emanate through dielectric layer D, with the net electric field in the dielectric diminished by electric polarization, depending on its dielectric constant $\in$, which can be anisotropic. See *Classical Electrodynamics 2nd Ed.*, John David Jackson, ©1975, John Wiley & Sons, New York.

Once in the vicinity of origination electrode 9, strong electrostatic image forces as described above provide for strong retention, with the electrostatic image field pointing in the same general direction as $E_a$ shown. In FIG. 3, a single bead or particle with a net positive charge is shown using positive symbolic charges, retained in a bead retention zone BRZ directly adjacent to origination electrode 9, or in an area subtended by a projection of origination electrode 9, shown downward on the page. The strength of the resulting electrostatic image force that results from the bead or particle shown in contact with dielectric layer D is a function of the bead charge and the dielectric constant $\in$ and thickness $t_D$ of dielectric layer D, and can be determined using the relationship in Eqn. (4) above, using the thickness $t_D$ as an approximation for the distance d, as long as an adjustment is made for the dielectric constant $\in$ of the dielectric layer D to gauge any electric field-reducing effect. For clarity, the presence of charge carriers that have moved into place to form an image charge on origination electrode 9 have not been symbolically shown. Also not shown is the electrostatic image field $E_{image}$ that results when a bead or particle is contacting the dielectric layer D. The electrostatic image field is typically large in magnitude, and were it an symbolic arrow, such as shown for the attraction field $E_a$, it would point in the same general direction, that is, perpendicular to the plane of origination electrode 9, but would typically be too long to be conveniently indicated on the figure.

Since any discrimination field $E_{discrim}$ (not shown) applied across the bead manipulation theater, and any polarization field $E_p$ (not shown) established there, are relatively small in the vicinity of the bead retention zone BRZ, any net or overall electric field acting to retain a bead there, $E_{retain}$, is approximately equal to the sum of the electrostatic image field $E_{image}$, any attraction fields $E_a$, and any repulsion fields $E_r$:

$$E_{retain} = E_{image} + E_a + E_r \quad (6)$$

and the resultant retaining force $F_{retain}$ on any retained bead with charge q is effectively a function of only the electrostatic image force and the attraction or repulsion bias applied to one or more attraction electrodes AE:

$$F_{retain} = q \, E_{retain} = q(E_{image} + E_a + E_r) \quad (7)$$

To move beads or particles reliably to another destination, this retaining force $F_{retain}$ must be reduced, allowing a movement away from the electrostatic image force found at the origination electrode, and reducing net frictional forces for sliding or rolling processes, as discussed above at Eqn (5).

Figure 4:
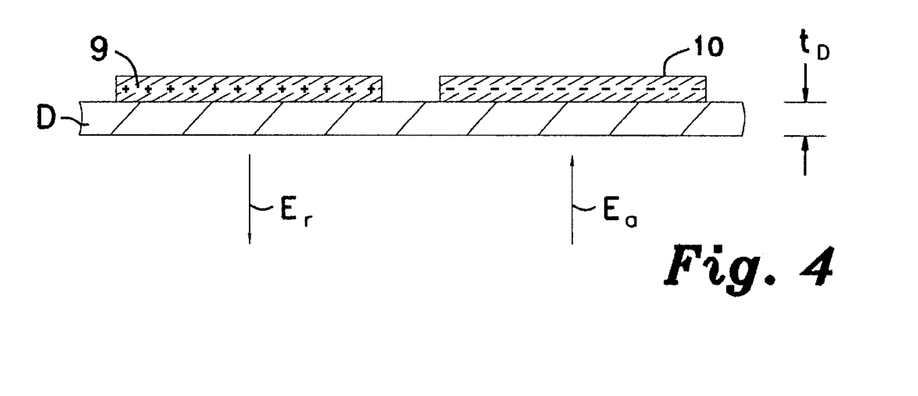
FIG. 4 shows the partial cross-sectional view of FIG. 2, now with a repulsive bias applied to the origination electrode and an attraction bias applied to the target electrode, showing selected rough electric fields.
Figure 5:
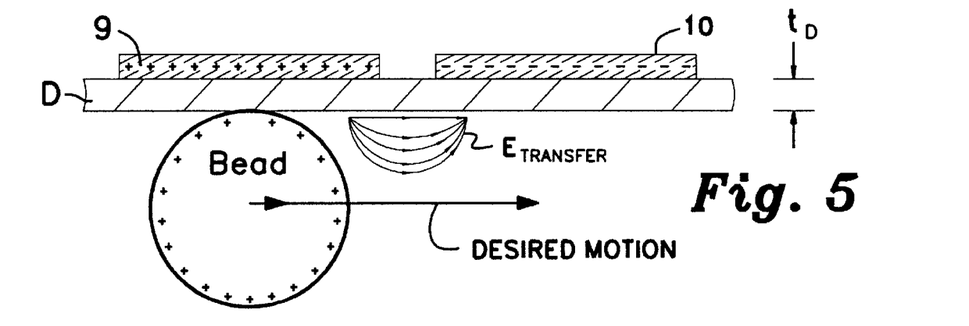
FIG. 5 shows the partial cross-sectional view of FIG. 4, with a bead at the origination electrode being urged toward the target electrode.

Referring now to FIGS. 4 and 5, the partial cross-sectional view of FIG. 2 is shown where now an attempt is made to transfer the bead shown in FIG. 5 from origination electrode 9 to target electrode 10 in a conventional manner (with the desired motion direction shown by the arrow labeled, DESIRED MOTION) by applying a repulsive bias now to the origination electrode 9, shown symbolically with net positive charges. For greater clarity, FIG. 4 is simplified, showing this repulsive bias on origination electrode 9 without the bead or particle, revealing an applied repulsion field $E_r$, as roughly shown pointing toward origination electrode 9. At the same time, an attraction bias is now applied to the target electrode 10, now shown symbolically with net negative charges. Simplified FIG. 4 shows a new applied attraction field $E_a$, roughly shown pointing toward target electrode 10, urging beads or particles to be attracted and retained at a second bead retention zone adjacent the target electrode 10.

While the fields $E_r$ and $E_a$ usually would have a minimal effect on the electrostatic image force established by the origination electrode 9, they do combine by superposition to form an electric transfer field $E_{transfer}$, shown in rough form on FIG. 5. As shown here, the electric transfer field $E_{transfer}$ is the sum of the repulsion field $E_r$ and the attraction field $E_a$:

$$E_{transfer} = E_r + E_a \quad (8)$$

and these two contributions, a repulsive or negative contribution from the origination electrode 9, and an attractive contribution from the target electrode 10, serve to urge the bead in a conventional manner, to the target electrode 10. The result is that in addition to the contribution of the electrostatic image field $E_{image}$ (generated at origination electrode 9) to the retaining field $E_{retain}$, there is a different contribution from the electric transfer field:

$$E_{retain} = E_{image} + E_{trasfer} = E_{image} + E_r + E_a \quad (9)$$

With high enough applied attraction and repulsion potentials applied to establish fields $E_r$ and $E_a$, this transfer field can often be sufficient to induce desired bead or particle motion, but such high potentials often bring on the problems previously mentioned, including possible arcing and unintended misquoting of other beads or particles.

Figure 6:
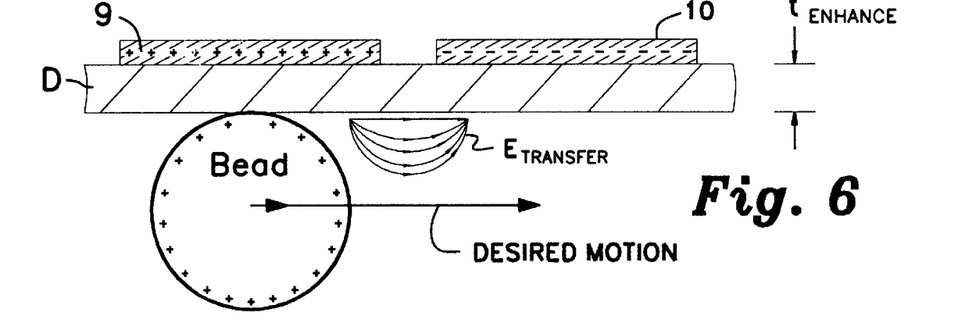
FIG. 6 shows the partial cross-sectional view of FIG. 5, where according to the invention, the transporter chuck incorporates a chosen dielectric thickness $t_{enhance}$.

One possible solution to such problems is to choose judiciously the thickness $t_D$ of dielectric layer D to be a particular value, such as shown in FIG. 6, where the partial cross-sectional view of FIG. 5 is shown, and where according to the invention, the transporter chuck incorporates a chosen dielectric thickness $t_{enhance}$. Dielectric thickness $t_{enhance}$ is chosen to lower the electrostatic image force generated in the surface of origination electrode 9 to a level sufficient to enhance the probability of reliable and repeatable transfers of the bead or particle from origination electrode 9 to target electrode 10. Specifically, dielectric thickness $t_{enhance}$ is chosen so that the contribution from the electrostatic image field $E_{image}$ is reduced sufficiently to allow the repulsion field $E_r$ and attraction field $E_a$ to dominate when applied, allowing the fields to determine the spatial fate of the beads or particles in a repeatable and reliable way. Using equation (4) above, one can calculate an acceptable net thickness d of dielectric layer D that will diminish the operational electrostatic image force $F_{image}$ to where it is weak enough to allow transfers using the repulsive and attractive applied fields $E_r$ and $E_a$ alone, yet still strong enough to provide for bead or particle retention in the face of ambient factors like air currents, particulate bombardments or exposure, gross movements of the transporter chuck, and the force of gravity.

A minimum electrostatic image force $F_{image\_min}$ needed at the origination electrode 9 to allow for bead or particle retention in the face of these ambient factors can be determined empirically or calculated, as mentioned. A maximum electrostatic image force $F_{image\_max}$ that will still allow transfers using repulsive and attractive applied fields $E_a$ and $E_r$ at the origination and target electrodes without arcing or misquoting of beads or particles can also be calculated or determined empirically. The thickness $t_D$ of dielectric layer D can be chosen to be any number of particular values $t_{enhance}$ such that the resultant electrostatic image force $F_{image}$ obtained at any origination electrode is between $F_{image\_min}$ and $F_{image\_max}$:

$$F_{image\_min} < F_{image} < F_{image\_max} \quad (10)$$

While this method provides for enhanced performance for bead transfers, problems with reliability and repeatability can also be addressed with the invention.

Figure 7:
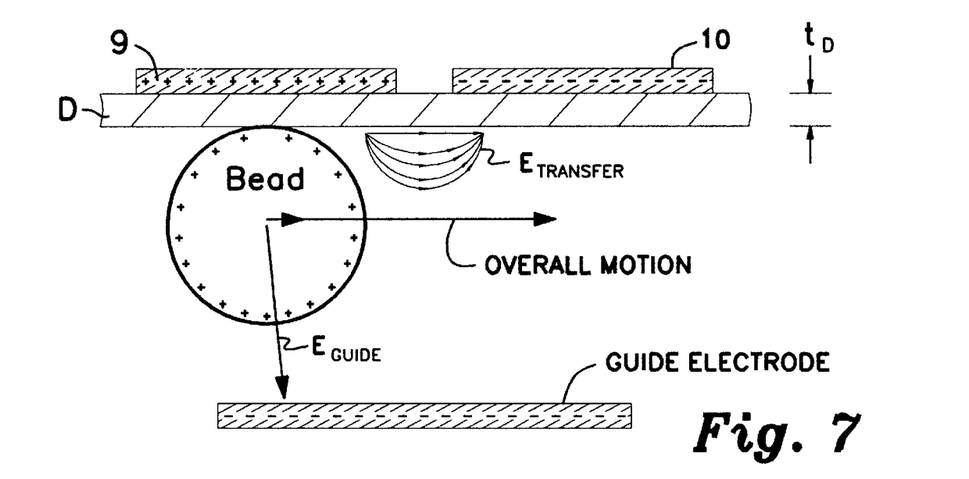
FIG. 7 shows the partial cross-sectional view of FIG. 5, employing a guide electrode to facilitate and enhance bead movement according to the invention.

A better solution that has been discovered is the use of guide electrodes as shown in FIG. 7, where the partial cross-sectional view of FIG. 5 is shown, but now employing a guide electrode to facilitate and enhance bead or particle movement according to the invention. Using this method, a new contribution to the total electric field $E_{total}$ is introduced by means of a guide electrode (shown, GUIDE ELECTRODE) which is positioned, sized and oriented adjacent (typically over) one or both of origination electrode 9 and target electrode 10, or one or both of their associated bead retention zones, permanently or temporarily, so as to influence the bead or particle and help urge the bead or particle away from the origination electrode 9. The guide electrode can also be biased attractively to urge further a motion from origination electrode 9 to target electrode 10.

Specifically, by positioning a guide electrode over the origination electrode 9, the bead or particle retained at the bead retention zone BRZ adjacent to origination electrode 9 will experience a new guide field induced by the guide electrode, $E_{GUIDE}$, as shown pointing away from the origination electrode 9. The new guide field provided by the guide electrode has two components:

[1] $E_{guide\_image}$, a new electrostatic guide image field resulting from rearrangement of charges on the guide electrode conductive surface in response to the bead or particle; and

[2] $E_{guide\_a}$, a new guide attraction field resulting whenever the guide electrode is attractively biased toward the charged bead or particle:

$$E_{GUIDE} = E_{guide\_image} + E_{guide\_a} \quad (11)$$

With a large component of $E_{GUIDE}$ pointing in a direction opposite that of origination electrode 9 and its electrostatic image field $E_{image}$, the bead retained at bead retention zone BRZ now experiences an partial vector cancellation of effects of the retaining field, $E_{retain}$ (see above Eqn (9)) generated by origination electrode 9. The total electric field experienced by the bead is now approximately the sum of the retaining field and the guide field:

$$E_{total} = E_{GUIDE} + E_{retain} = E_{guide\_image} + E_{guide\_a} + E_{image} + E_a + E_r \quad (12)$$

These fields change as a function of position, but the overall effect is to relieve the bead or particle from at least some of the effects of the strong electrostatic image force generated at origination electrode 9 that would tend to keep the bead or particle in place, or make it harder to direct the bead or particle to a target location. Initial motion is made easier through the reduction of the frictional force $F_a$ because of the reduction in the effect of the electrostatic image force $F_{image}$. Overall motion (shown, OVERALL MOTION) is an end result, with the bead being freed to move toward target electrode 10. Even though the bead may undergo bouncing, lateral movements, vibrations, spinning, etc., in general, with a lower normal retaining force $F_{retain}$, it is urged ultimately to be retained, both accurately and reproducible, at target electrode 10.

The guide electrode, shown here as an example, can comprise a single conductive pad, conductive strip, a dual strip, or any other configuration that allows for production of a guide field $E_{GUIDE}$ at the bead or particle. For example, the guide electrode can be a conductive mesh, producing periodic values of $E_{GUIDE}$ that reduce the effects of electrostatic image forces $E_{image}$ at the origination electrode 9 and many other similar electrodes that can form part of a matrix or array.

The spacing of the guide electrode surface from any retained beads or particles, or from the bead retention zones or attraction electrodes can vary, and is a function of the mean and standard deviation of the bead or particle diameter; type of guide electrode, including the presence of irregularities; the anticipated or allowable guide electrode potential $V_{GUIDE}$, if any; and the amount of vector cancellation of the electrostatic image force $F_{image}$ generated at the origination electrode in question. The particular value of the spacing can vary from a few multiples of bead or particle diameters to a few millimeters or more, and can be determined empirically with or without any quantitative determination such as the rough model given above in Eqn (4).

In practice, one can introduce charged beads or particles into a bead dispenser or container (not shown). For attracting and retaining positively charged beads or particles, for example, one can set up a discrimination field $E_{discrim}$ by applying a positive bias to a conductive surface in the bead container or a tribo-charging mesh, and a negative bias to the origination electrode 9, while grounded shield electrodes (not shown) can help define electric fields, guiding beads or particles to their intended destinations at any or all bead retention zones BRZ. This system of electrical biases will function in sorting out beads or particles according to polarity and charge/mass ratio, with beads or particles of a certain charge/mass ratio and correct polarity being encouraged to seat themselves at the bead retention zones.

Available bead or particle compositions are well known in the art, and are typically polymer-based, such as divinylbenzene copolymer; polystyrene; polyethylene glycol; or polyethylene glycol graft polystyrene, such as supplied under the trade name PEG-PS by PerSeptive Biosystems of Framingham, Mass.; or cross-linked polyethylene glycol resin, as supplied by Rapp Polymer GmbH of Germany. Beads or particles can be dry, or can have absorbed or adsorbed an aqueous solution, or a fine powder. Beads or particles can also be, for example, dry paint or phosphor particles, or any other powders that can be triboelectrically charged.

Beads or particles can be charged prior to their application to the transporter chuck, for example, using plasma charging, or by the use of tribocharging (rubbing or contact charging) as known in the art. Materials that can be used for tribocharging include polytetrafluoroethylene (TEFLON®), and polymers of chlorotrifluorethylene, chlorinated propylene, vinyl chloride, chlorinated ether, 4-chlorostyrene, 4-chloro-4-methoxy-styrene, sulfone, epichlorhydrin, styrene, ethylene, carbonate, ethylene vinyl acetate, methyl methacrylate, vinyl acetate, vinyl butyral, 2-vinyl pyridine styrene, nylon and ethylene oxide. See, for example, "Triboelectrification of Polymers" in K. C. Frisch and A. Patsis, *Electrical Properties of Polymers* (Technomic Publications, Westport Conn.). Also see *Handbook of Electrostatic Processes,* Jen-shih Chang, Arnold J. Kelly, and Joseph M. Crowley, eds., Marcel Dekker, Inc., New York, ©1995. For example, polytetrafluoroethylene and polyethylene and other materials that become negatively charged tend to create a positive charge on the bead, particle or object. Nylon and other materials that become positively charged will tend to create a negative charge on the bead, particle or object. When using mechanical shaking to tribo charge polymer beads or particles, it is preferred that the ratio of the amount or mass of tribocharging material used to charge the beads or particles to the amount or mass of beads or particles is such that the respective total surface areas of the charge donating and charge receiving particle are about equal.

Although the bead retention zone BRZ formed on the exposed portion of dielectric layer D is shown as being flat, it can also be recessed, beveled, bowl-shaped, or have any other profile appropriate in the context. For example, profiles that can facilitate bead or particle attraction, retention, and discharge, particularly profiles that facilitate bead or particle size selectivity, are sought. All that is needed to practice this invention is to interpose a guide electrode adjacent to the origination electrode 9. This placement should be done so as to allow any attraction bias applied to the guide electrode, and any electrostatic image force generated by the guide electrode, to urge the bead away from origination electrode 9, making it easier to reliably transfer the bead or particle to a target electrode 10. Any origination electrode 9 can serve to provide an attraction field for a plurality of bead retention zones BRZ.

To aid in visual confirmation of bead or particle capture at the bead retention zone BRZ, a hole (not shown) can be provided through any of origination electrode 9, dielectric layer D, or other added structures. Such a hole provides a visual or optical monitor sight to verify if a bead or particle is being retained. Such monitoring allows for automated verification of bead or particle occupancy in the bead retention zone, using known sensors to determine the hole opacity in terms of percent light transmission. For example, the light transmitted through such a hole can be optically mapped onto an array detector such as a charge-coupled device (CCD), an intensified CCD array, a focal plane array, or photodiode array (PDA). The array detector can be, for example, a CCD (such as that available from DALSA, Inc. (Easton Conn.), Sarnoff Corporation (Princeton N.J.) or Princeton Instruments (Trenton N.J.); an intensified CCD array (such as that available from Princeton Instruments, Hamamatsu Corp. (Bridgewater, N.J.) or Photometrics Ltd. of Tucson, Ariz.); a focal plane array (such as that available from Scientific Imaging Technologies, Inc. (Beaverton, Oreg.), Eastman Kodak Co., Inc. (Rochester N.Y.) or Sarnoff Corporation); a photodiode array (such as that available from Reticon Corp. (Sunnyvale Calif.), Sensors Unlimited, Inc. (Princeton N.J.) or Hamamatsu); or a photodetector array (such as that available from FLIR Systems Inc. (Portland Oreg.), Loral Corp. (New York N.Y.) or Hughes Electronic Corp. (Los Angeles Calif.)).

In lieu of dielectric layer D, air or the ambient gas or vacuum can be used as a dielectric or insulator. Insulated mechanical standoffs or other fasteners can be used to hold elements in place. For example, standoffs can be used to hold origination electrode 9 in the same plane as, but offset from, target electrode 10 and any other added elements.

Thus, in some embodiments, origination electrode 9, or target electrode 10 can be directly exposed to the bead contact surface. Alternatively, the dielectric layer D can be eliminated, for example adjacent one of either the origination electrode 9 or target electrode 10.

Although the transporter chucks shown starting with FIG. 1 is given by way of example only, it should be said that fabrication techniques for forming its conductive layers and electrodes can vary considerably, as any known technique satisfying modest electrical and mechanical requirements can be used. Nearly any metal can be used, for example, to form electrodes 9 and 10, which can individually comprise thermally or electromagnetically deposited metals such as indium tin oxide, brass, platinum, copper, or gold, of any useful thickness, but preferably about 1000 Angstroms to 10 microns (100,000 Angstroms). The same is true for dielectric layer D—the materials used can be of any type compatible with surrounding electrodes, and having sufficient dielectric strength to withstand anticipated voltages applied, including ceramic materials; silicon dioxide; alumina; polyimide resins and sheets, polyethylene, tetrafluoroethylene (Teflon), other perfluoro polymers, or other suitable polymers; metallic oxides, such as aluminum oxide and titanium oxide; and titanates of calcium and magnesium. Dielectric layer D can range in thickness from ten Angstroms to 1000 microns. Various layers can be assembled, if desired, using well known adhesives.

Generally, attraction electrodes AE, such as origination electrode 9 and target electrode 10, can comprise any number of separately addressable pixels or elements in two directions x and y, each having separately controlled bead retention zones. Any number of well known means and structures can be used to facilitate addressing as is known in the electrical and electronic arts, e.g., plasma display driver technology. In this way, particles can be relayed to facilitate combinational synthesis or analysis.

Figure 8:
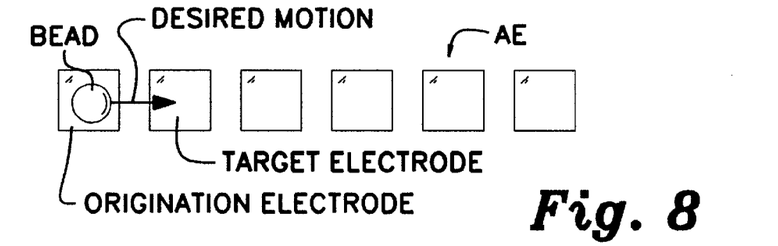
FIG. 8 shows a rough surface view of a linear array of bead attraction electrodes that correspond to bead retention zones, including an origination electrode and a target electrode.

Referring now to FIG. 8, a rough surface view is shown of a linear array of bead attraction electrodes AE that correspond to individual bead retention zones, including an origination electrode and a target electrode as indicated. Conventional means of effecting a transfer in a direction indicated (DESIRED MOTION) from origination electrode 9 to target electrode 10 would encounter the problems mentioned above.

Figure 9:
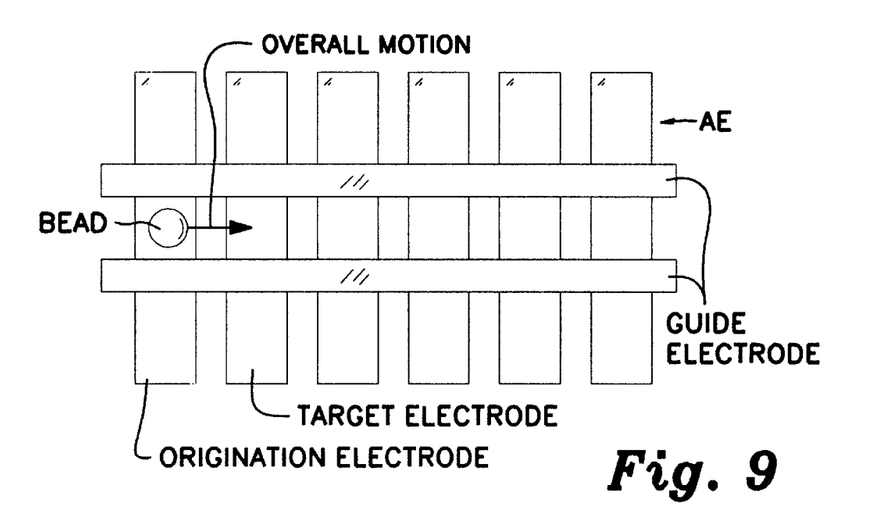
FIG. 9 shows a rough surface view of a similar linear array of bead attraction electrodes as shown in FIG. 8, employing two guide electrodes to facilitate and enhance one-dimensional bead movement according to the invention.

Using, however, the sample structure as given in FIG. 9, the transfer characteristics are improved markedly. FIG. 9 shows a rough surface view of a linear array of bead attraction electrodes as shown in FIG. 8, but where two guide electrodes are interposed over the attraction electrodes AE (shown longer here for clarity) to facilitate and enhance one-dimensional bead movement according to the invention. The operating principles given above apply here to any number of transfers along the linear direction, indicated as OVERALL MOTION.

Figure 10:
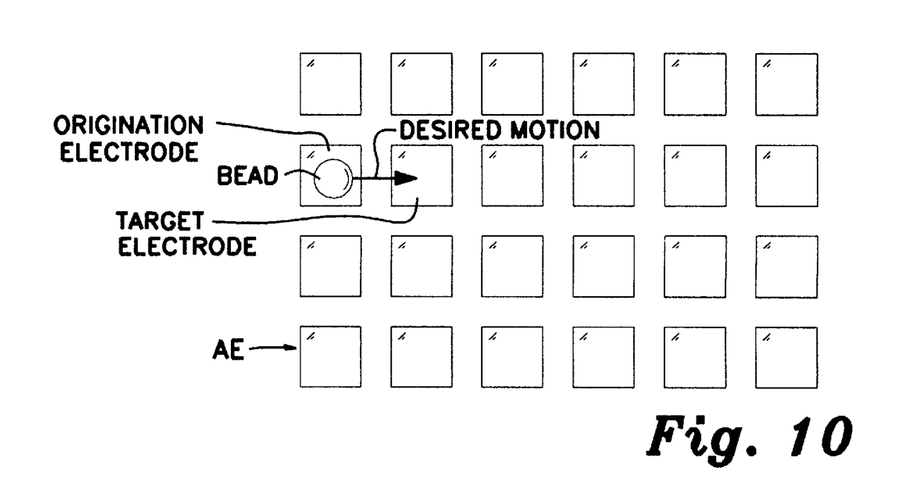
FIG. 10 shows a rough surface view of a two-dimensional array of bead attraction electrodes that correspond to bead retention zones, including an origination electrode and a target electrode.
Figure 11:
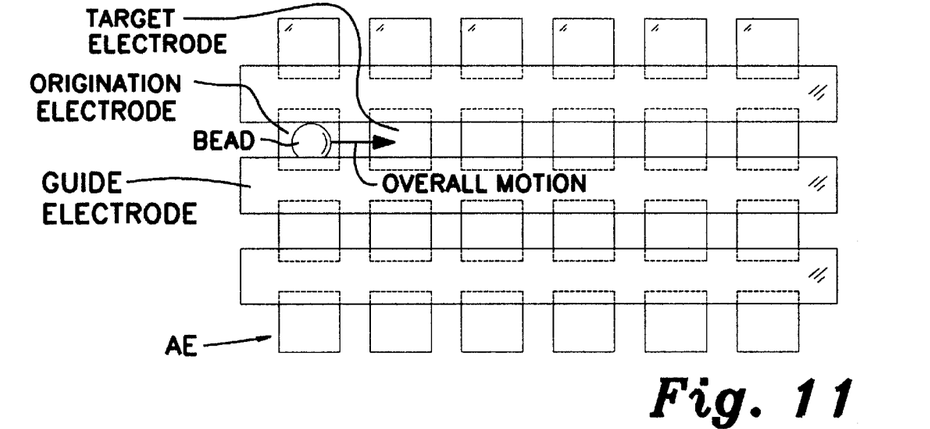
FIG. 11 shows a rough surface view of a similar two-dimensional array of bead attraction electrodes as shown in FIG. 10, employing three guide electrodes to facilitate and enhance two dimensional bead movement according to the invention, with a bead shown moving horizontally on the page.

Referring now to FIGS. 10 and 11, a similar scheme is disclosed to allow enhanced two dimensional bead or particle motions. FIG. 10 shows a rough surface view of a two-dimensional array of bead attraction electrodes AE that correspond to bead retention zones, including an origination electrode (ORIGINATION ELECTRODE) and a target electrode (TARGET ELECTRODE) as indicated. Again, addition or presentation of strips of guide electrodes can be added as shown and indicated in FIG. 11, which shows the same rough surface view of the two-dimensional array of bead attraction electrodes of FIG. 10, but now employing three guide electrodes presented horizontally. Again, the same principles apply, with $E_{GUIDE}$ again having a component in a direction substantially opposite the electrostatic image field(s) $E_{image}$ generated at attraction electrodes AE. Even though the bead or particle is shown moving horizontally on the page (indicated, OVERALL MOTION), true two dimensional bead or particle movement is possible.

Figure 12:
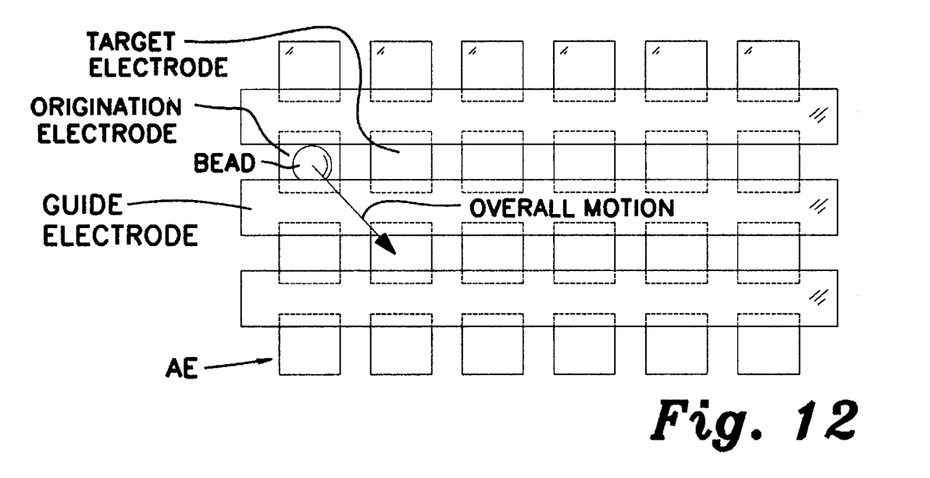
FIG. 12 shows another rough surface view of a similar two-dimensional array of bead attraction electrodes as shown in FIG. 10, employing three guide electrodes to facilitate and enhance two dimensional bead movement according to the invention, with a bead shown moving diagonally on the page.

Referring now to FIG. 12, the same type of rough surface view as given in FIG. 11 is shown, where now the bead motion shown is diagonal, as indicated on the page, from the origination to target electrodes as indicated. Note that the origination and target electrodes are not immediately adjacent one another.

Concomitant with manipulations via the guide electrodes given, gross motion of a transporter chuck or selected attraction electrodes AE can be provided.

Figure 13:
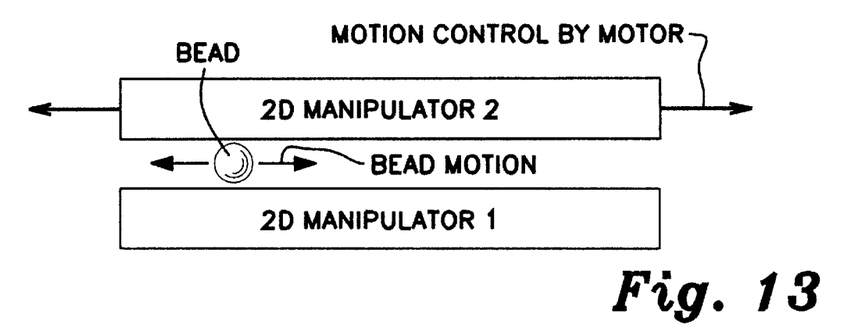
FIG. 13 shows a possible arrangement of two adjacent two-dimensional manipulators each comprising the two-dimensional arrays of bead attraction electrodes as shown in FIGS. 11 and 12, allowing matrix manipulations aided by a stepper motor.

Referring to FIG. 13, a possible arrangement of two adjacent two-dimensional manipulators each comprising the two-dimensional arrays of bead attraction electrodes as shown in FIGS. 11 and 12 is shown. A first transporter chuck or array, indicated as 2D MANIPULATOR 1 is shown receiving a bead or particle (BEAD) retained on a second transporter chuck or array, indicated as 2D MANIPULATOR 2. 2D MANIPULATOR 2 is itself undergoing gross horizontal motion during a matrix manipulation aided by a stepper motor, not shown, that provides horizontal motion (MOTION CONTROL BY MOTOR). This gross motion provided by stepper motor can yield a bead motion (indicated, BEAD MOTION), and allow for a bead transfer to a desired location that might otherwise be difficult through the use of guide electrodes alone. The gross motion of 2D MANIPULATOR 2 can also be vertical on the page, or to and from another transporter chuck in 3-dimensional space.

Preferably, the guide electrode potential $V_{GUIDE}$ is kept between the algebraic potentials $V_{orig}$ and $V_{target}$ of the origination electrode 9 and target electrode 10, $$V_{orig} \alpha V_{GUIDE} \alpha V_{target} \text{ or } V_{orig} \chi V_{GUIDE} \chi V_{target} \qquad (13)$$

although such regulation is not strictly necessary, particularly if the voltages are modulated using information feedback of bead position.

If desired, when the bead is free from the electrostatic image force at the origination electrode, the transporter chuck using the invention can go into a different mode where repulsion of the bead from the guide electrode toward the target electrode can be achieved by reducing the guide electrode potential, such as by applying a repulsive bias or potential to the guide electrode, thereby establishing a repulsive guide field $E_{guide\_r}$ in lieu of the attractive guide field $E_{guide\_a}$ given above. Alternatively, the guide electrode can be grounded.

Experimental verification confirms operation advantages of use of guide electrodes. Using interdigitated structures for the attraction electrodes AE covered by 10 µm dielectric bead transfers from any number of origination electrodes to target electrodes are confirmed using 500 µm high molecular weight polystyrene beads or particles, where attractive bias at attraction electrodes ranges from, for example, 200–2000 volts (preferably 100 to 500 volts), and $V_{GUIDE}$ potentials are between $V_{orig}$ and $V_{target}$ as given above. When manipulating negatively charged beads or particles, one can simply reverse the applied voltages from those given in this discussion.

Useful electrodes include, for example, attraction electrodes of widths from 50 µm to 1 mm, preferably from 100 to 500 µm. Lengths can be, for example, of corresponding size; or, where the attraction electrodes are strips, substantially longer. Guide electrodes are, for example, spaced from 10 µm to 1 mm from the bead contact surfaces, preferably from 25 µm to 250 µm from the bead contact surfaces. Guide electrodes can be, for example, strips, screens, perforated sheets, and the like. $V_{orig}$ can be, for example, from 0 volts to 2,000 volts, preferably from 100 volts to 500 volts, when activated to attract beads or particles, and from 0 volts to 2,000 volts, preferably from 50 volts to 500 volts, using the opposite polarity, when activated to repel beads or particles. $V_{target}$ can be, for example, from 0 volts to 2,000 volts, preferably from 100 volts to 500 volts. $V_{GUIDE}$ can be, for example, from 100 volts to 1,000 volts, preferably from 200 volts to 300 volts. The timing or synchronization of activations of potentials is believed to be important, as sharp edges to rising and falling potentials are believed to enhance transfer of beads or particles.

The guide electrodes can be movable with respect to the bead retention zones of the transporter chuck, and the bead retention zones of the transporter chuck and the guide electrodes can be selectively brought near one another to assist during bead transfers. This movement can be helpful in an automated matrix manipulation line, counting apparatus, or deposition station, (used, for example, where a pharmaceutically active ingredient is transferred).

Figure 14:
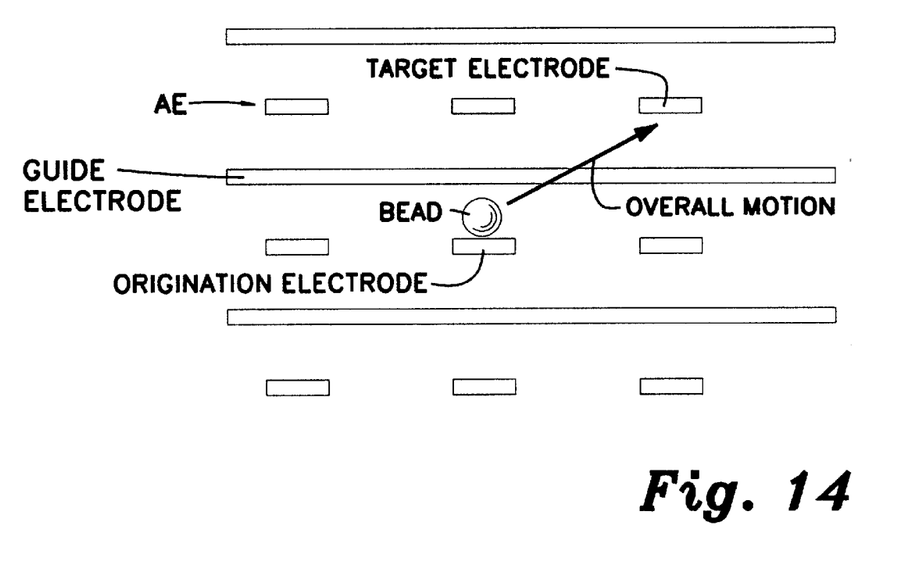
FIG. 14 shows a partial cross-sectional view of a possible three dimensional bead manipulation system according to the present invention, using guide electrodes to facilitate and enhance three dimensional bead movement according to the invention, with a bead shown moving diagonally on the page.

The guide electrodes can also be sized and shaped to allow beads or particles to pass through them. Referring to FIG. 14, a partial cross-sectional view of a possible three dimensional bead manipulation system according to the present invention is shown, using guide electrodes to facilitate and enhance three dimensional bead movement among attraction electrodes AE. As shown, a bead or particle (BEAD) is moving diagonally on the page, from an origination electrode at one vertical level to a target electrode on another vertical level, shown using a diagonal OVERALL MOTION as indicated. Note that the origination electrode is not immediately adjacent to the target electrode. As mentioned above, when a bead or particle is free from the electrostatic image force at the origination electrode, repulsion of the bead from the guide electrode toward the target electrode, such as a target electrode on a different vertical level, can be achieved by applying a repulsive potential to the guide electrode, thereby establishing a repulsive guide field $E_{guide\_r}$, in lieu of the attractive guide field $E_{guide\_a}$ given above. In this way, beads or particles can be discouraged from sticking to guide electrodes as they pass through on their way to target electrodes.

In the course of using transporter chucks with guide electrodes, a number of conventional operating modes not employing guide electrodes can be used. For bead pickup or retention, an attraction electrode AE, either exposed or unexposed to the bead contact surface, is electrically biased to attract beads or particles, while other conductive surfaces in the bead dispenser or container can be biased oppositely. Any number of bead electrodes 9 can be used, and they can be individually and separately connected by known means to facilitate individual and selective addressing in two dimensions.

Once attracted and retained, beads or particles on the transporter chuck are optionally transported to a substrate, microtiter plate, or other destination by moving the entire transporter chuck; or alternatively, the target substrate or plate is brought to the chuck. Beads or particles are then released or discharged in a controlled manner when any or all of the applied voltages are reversed or set to zero. For example, for bead release, the origination electrode 9 can be shorted out or grounded (0 volts), or have an opposite voltage applied. Optionally, when any shield electrode is used to shape the electric fields, such shield electrode can be biased to be repulsive to beads or particles during bead discharge. Acoustic releasing mechanisms or processes can be used to aid in bead discharge and placement.

During a bead transfer to a target electrode, one can apply an attractive bias to the target electrode to urge the bead to the target electrode. The effectiveness of the guide electrode during this process can be increased by applying an attractive potential to the guide to reduce frictional forces as mentioned; upon successful transfer of a bead from the origination electrode to the target electrode, one can reduce the third potential applied to the guide electrode, including possibly grounding the guide electrode or applying a guide repulsive bias to it, as mentioned.

When using transporter chucks according to the present invention, the temperature is preferably between −50° C. and 200° C., and more preferably between about 22° C. and 60° C. Relative humidity can be 0–100 percent, so long as condensation does not occur; more preferably the relative humidity is about 30 percent.

In using the guide electrodes as given, one can expose the bead contact surface of such a chuck to beads or particles; selectively apply an attraction bias to one or more attraction electrodes AE associated with each x-y addressable well, pixel, or individual spatial element of the chuck, to attract and retain beads or particles selectively at bead retention zones; and then move one or more beads or particles onto target destinations with the aid of adjacent guide electrodes. This movement can be done using a potential $V_{GUIDE}$ as mentioned above, or one can simply exploiting the competing electrostatic image force that an interposed guide electrode can provide to reduce the electrostatic image force already established at the origination electrode(s). One can then align the transporter chuck with another similar chuck or other destination by selectively reversing or reducing voltages associated with each bead retention zone as required.

Beads or particles attracted by the chuck, especially large diameter beads, particles or objects of large overall size, say 3 mm in diameter, can become viable substrates, to be coated with a pharmaceutically active compound. Such beads or particles could include oblong shapes, made of water soluble film, such as hydroxypropyl methyl cellulose resin. This process can be scaled up for large scale continuous manufacturing, such as using a sheet of an edible substrate for use with tablets, for example, or a sheet of an inhaler substrate. For example, hydroxypropyl methyl cellulose can be used, such as Edisol M Film M-900 or EM 1100 available from Polymer Films Inc. (Rockville Conn.). Generally, sizing of bead diameters can range from less than one micron to 1000 microns or larger; 150 microns is fairly typical. See U.S. Pat. No. 5,714,007, "Apparatus for Electronically Depositing a Medicament Powder Upon Predefined Regions of a Substrate," and U.S. Pat. No. 6,007, 630.

Through the present teachings, electrostatic chucks can effect intra-chuck bead transfers to target locations with high resolution and accuracy. Using guide electrodes allows for smaller inter-electrode pitch, with pitch as small as one bead diameter. The methods are usable for PEG (polyethylene glycol) coated beads or particles and other pharmaceutical beads or particles. Multiple columns or rows of beads or particles can undergo uniform mass transport, counting, or matrix operations.

All publications and references, including but not limited to patents and patent applications, cited in this specification are herein incorporated by reference in their entirety as if each individual publication or reference were specifically and individually indicated to be incorporated by reference herein as being fully set forth. Any patent application to which this application claims priority is also incorporated by reference herein in its entirety in the manner described above for publications and references.

While this invention has been described with an emphasis upon preferred embodiments, it will be obvious to those of ordinary skill in the art that variations in the preferred devices and methods can be used and that it is intended that the invention can be practiced otherwise than as specifically described herein. Accordingly, this invention includes all modifications encompassed within the spirit and scope of the invention as defined by the claims that follow.

What is claimed is:

1. A method of moving a charged particle from a first position at which it is retained by a first electrode to a second position at which it is retained by a second electrode, the method comprising:

applying a potential to the second electrode to attract the particle; and applying a potential to a guide electrode offset from the particle at the first position,
wherein the applied potential is effective to reduce the attraction of the particle to the first position sufficiently to allow the potential applied at the second electrode to be effective to move the particle from the first position to the second position.

2. The method of claim 1, wherein the first electrode is separated from the first position by a dielectric selected to reduce an image force induced between the first electrode and the particle sufficiently to allow said applying steps to be effective to move the particle without voltage arcing between electrodes, while maintaining a sufficient image force to retain the particle at the first position prior to application of the two applying steps.

3. A transporter chuck for attracting particles to first or second bead retaining zones (BRZ) on a bead contact surface (BCS), and for allowing assisted transfer of at least one of the particles from the first bead retaining zone to the second bead retaining zone, the transporter chuck comprising:

an origination electrode for selectively establishing an attraction field ($E_a$) at the first bead retaining zone;

a target electrode for selectively establishing an attraction field at the second bead retaining zone; and a guide electrode positioned, sized and oriented adjacent at least one of the origination electrode, the target electrode, the first and the second bead retaining zones, so as to establish a guide field ($E_{GUIDE}$),
wherein the guide field urges any of the particles retained at the first bead retaining zone to move away from the first bead retaining zone.

4. The transporter chuck of claim 3, wherein the guide electrode is biased attractively with respect to at least one of the beads.

5. The transporter chuck of claim 3, further comprising a dielectric (D) positioned between the first bead retaining zone and the origination electrode or between the second bead retaining zone and the target electrode.

6. The transporter chuck of claim 5, wherein the dielectric comprises a chosen dielectric thickness ($t_{enhance}$).

7. The transporter chuck of claim 3, wherein the guide electrode is movable with respect to the first and second bead retaining zones of the transporter chuck, wherein the first and second bead retaining zones, and the guide electrode, can be selectively brought near one another.

8. The transporter chuck of claim 3, further comprising an array of bead retaining zones wherein the first and second bead retaining zones are not immediately adjacent one another.

9. The transporter chuck of claim 8, wherein the array is two-dimensional.

10. The transporter chuck of claim 8, wherein the array is three-dimensional.

11. A method for transporting beads using a transporter chuck for attracting particles to first or second bead retaining zones (BRZ) on a bead contact surface (BCS), and for allowing assisted transfer of at least one of the particles from the first bead retaining zone to the second bead retaining zone, which transporter chuck comprises:

an origination electrode for selectively establishing an attraction field ($E_a$) at the first bead retaining zone;

a target electrode for selectively establishing an attraction field at the second bead retaining zone; and a guide electrode positioned, sized and oriented adjacent at least one of the origination electrode, the target electrode, the first and the second bead retaining zones, so as to establish a guide field ($E_{GUIDE}$), wherein the guide field urges any of the particles retained at the first bead retaining zone to move away from the first bead retaining zone;

the method comprising:

[a] applying a first potential ($V_{orig}$) to the origination electrode of the transporter chuck establish an attraction field ($E_a$); and

[b] attracting and retaining a bead to the first bead retaining zone.

12. The method of claim 11, additionally comprising:

[c] reducing the first potential applied to the origination electrode; and

[d] applying a second potential ($V_{target}$) to the target electrode of the transporter chuck to establish a second attraction field, thereby urging the bead to the target electrode.

13. The method of claim 12, additionally comprising:

[e] aligning the transporter chuck with a desired location.

14. The method of claim 12, additionally comprising:

[f] grounding the origination electrode.

15. The method of claim 12, additionally comprising:

[g] applying a repulsive bias to the origination electrode to establish a repulsion field ($E_r$).

16. The method of claim 12, additionally comprising:

[h] applying a third potential ($V_{GUIDE}$) to the guide electrode of the transporter chuck to establish a guide attraction field ($E_{guide\_a}$).

17. The method of claim 16, additionally comprising:

[i] reducing the third potential applied to the guide electrode.

18. The method of claim 17, additionally comprising:

[j] grounding the guide electrode.

19. The method of claim 17, additionally comprising:

[k] applying a guide repulsive bias to the guide electrode to establish a repulsive guide field ($E_{guide\_r}$).

* * * * *